(12) United States Patent
Greco

(10) Patent No.: US 11,616,524 B2
(45) Date of Patent: Mar. 28, 2023

(54) SHIELD FOR A FIRST RESPONDER RADIO

(71) Applicant: Joseph K. Greco, Temecula, CA (US)

(72) Inventor: Joseph K. Greco, Temecula, CA (US)

( * ) Notice: Subject to any disclaimer, the term of this patent is extended or adjusted under 35 U.S.C. 154(b) by 0 days.

(21) Appl. No.: 17/354,619

(22) Filed: Jun. 22, 2021

(65) Prior Publication Data
US 2021/0399756 A1 Dec. 23, 2021

Related U.S. Application Data

(60) Provisional application No. 63/042,680, filed on Jun. 23, 2020.

(51) Int. Cl.
*H04B 1/3888* (2015.01)
*H04B 1/3827* (2015.01)

(52) U.S. Cl.
CPC ......... *H04B 1/3888* (2013.01); *H04B 1/3833* (2013.01)

(58) Field of Classification Search
CPC .............................. H04B 1/3888; H04B 1/3833
See application file for complete search history.

(56) References Cited

U.S. PATENT DOCUMENTS

| | | | | |
|---|---|---|---|---|
| 2,706,774 A * | 4/1955 | Bowman | ................ | G05G 1/12 74/553 |
| 3,345,568 A * | 10/1967 | Errichiello | ........... | H04B 1/3833 455/90.3 |
| 4,993,280 A * | 2/1991 | Olkoski | ................... | G05G 1/10 74/553 |
| 5,025,921 A * | 6/1991 | Gasparaitis | .......... | H04B 1/3888 206/521 |
| 5,159,706 A * | 10/1992 | Hodsdon | .................. | H04B 1/38 455/90.3 |
| 6,390,845 B1* | 5/2002 | Brady | .................. | H01R 13/621 439/372 |
| 6,751,312 B1* | 6/2004 | Kudoh | .................. | G06F 3/0213 379/368 |
| 6,831,238 B1* | 12/2004 | Lau | ....................... | H01H 25/002 200/6 A |
| 7,163,509 B2* | 1/2007 | Abe | .................... | A61B 1/00071 600/117 |
| 7,223,926 B1* | 5/2007 | Gannon | .................... | G05G 5/02 200/566 |
| 9,337,881 B2* | 5/2016 | Aihsan | .................... | G06F 3/147 |

(Continued)

*Primary Examiner* — Jinsong Hu
*Assistant Examiner* — Rui M Hu
(74) *Attorney, Agent, or Firm* — Anthony Smyth; Loza & Loza, LLP

(57) ABSTRACT

A cover or shield for a mobile radio includes a first cylindrical portion configured to fit a first knob, a second cylindrical portion configured to fit a second knob, and a bridge. A first end of the bridge may be fixed to the first cylindrical portion, and a second end of the bridge may be fixed to the second cylindrical portion. The bridge may be configured to orient the first cylindrical portion and the second cylindrical portion in alignment with the first knob and the second knob, respectively. In one example, the first cylindrical portion includes a cut-out configured to allow manipulation of the first knob by an operator of the portable radio. In another example, the second cylindrical portion is shorter than the second knob providing access to an upper section of the second knob by an operator of the portable radio.

20 Claims, 8 Drawing Sheets

(56) References Cited

U.S. PATENT DOCUMENTS

| | | | | |
|---|---|---|---|---|
| 9,384,920 | B1* | 7/2016 | Bakulich | H01H 9/24 |
| 9,935,668 | B1* | 4/2018 | Morse | H01R 13/6275 |
| 10,102,403 | B1* | 10/2018 | Akens | G06F 3/167 |
| 10,424,177 | B1* | 9/2019 | Gan | G08B 21/02 |
| 10,615,836 | B1* | 4/2020 | Akens | H04B 1/3833 |
| 2008/0236329 | A1* | 10/2008 | Slavin | G05G 1/10 |
| | | | | 361/679.01 |
| 2009/0197545 | A1* | 8/2009 | Gong | H04M 1/236 |
| | | | | 455/90.2 |
| 2012/0298494 | A1* | 11/2012 | Mahida | G05G 5/06 |
| | | | | 200/336 |
| 2013/0239904 | A1* | 9/2013 | Kim | A01K 15/021 |
| | | | | 119/719 |
| 2014/0010383 | A1* | 1/2014 | Mackey | H04M 1/03 |
| | | | | 381/71.1 |
| 2014/0303720 | A1* | 10/2014 | Sugimoto | A61F 2/2466 |
| | | | | 623/2.11 |
| 2015/0136574 | A1* | 5/2015 | Richards | H01H 19/14 |
| | | | | 200/336 |
| 2015/0145679 | A1* | 5/2015 | Haskin | G06Q 10/087 |
| | | | | 29/402.08 |
| 2015/0171505 | A1* | 6/2015 | Harel | H01Q 1/52 |
| | | | | 455/90.3 |
| 2015/0207206 | A1* | 7/2015 | Bartholomew | H04M 1/02 |
| | | | | 455/90.2 |
| 2015/0222311 | A1* | 8/2015 | Teoh | H05K 9/0047 |
| | | | | 455/90.3 |
| 2015/0381230 | A1* | 12/2015 | Suppelsa | H04B 1/48 |
| | | | | 455/77 |
| 2021/0159649 | A1* | 5/2021 | O'Keeffe | H01R 24/28 |

* cited by examiner

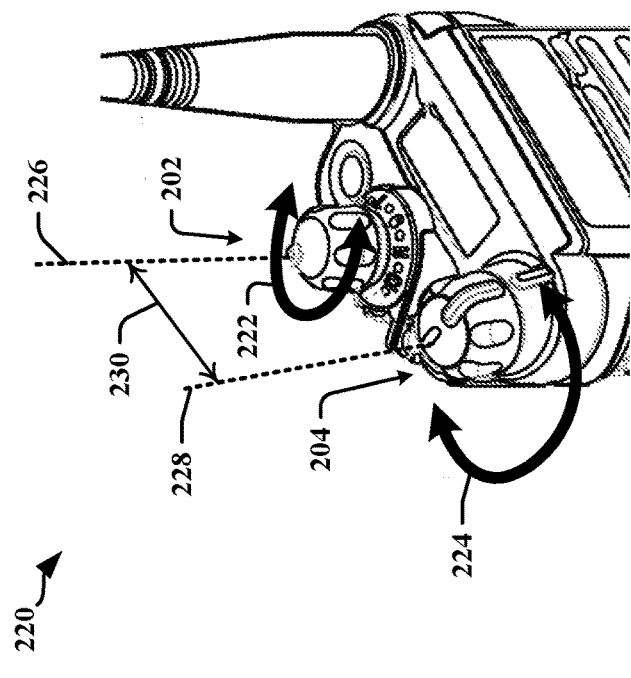
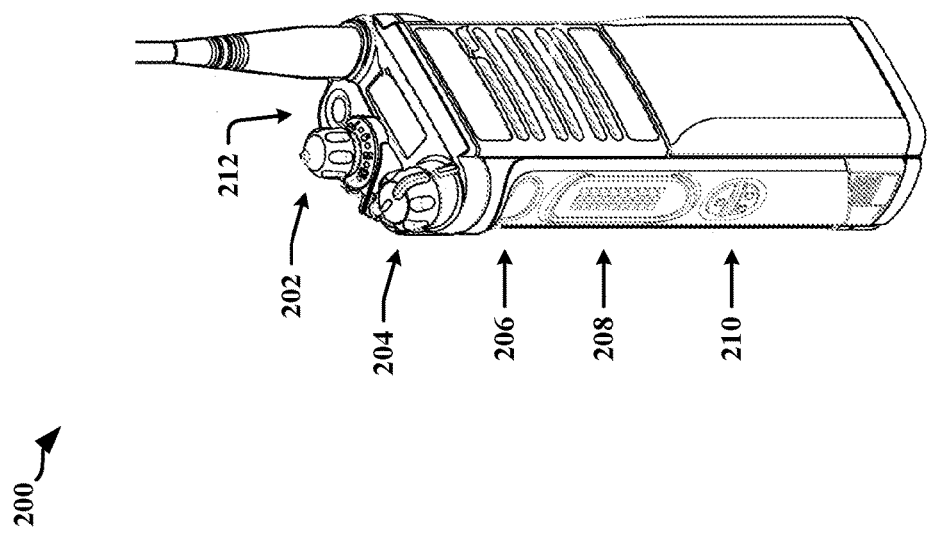
FIG. 2

SHIELD FOR A FIRST RESPONDER RADIO

CROSS-REFERENCE TO RELATED APPLICATIONS

This application for patent claims priority to and the benefit of provisional patent application No. 63/042,680 filed in the United States Patent and Trademark Office on Jun. 23, 2020, the entire content of which is incorporated herein by reference as if fully set forth below in its entirety and for all applicable purposes.

TECHNICAL FIELD

This invention relates to communication equipment, and more particularly to a shield or cover that prevents unintended manipulation of radio controls in a first-responder handheld radio system.

BACKGROUND

Portable radio equipment used by police, fire, and other first responders is typically designed for ruggedness and ease of use and to ensure that the equipment can be used safely and efficiently by operators under chaotic conditions and/or while the operator is engaged in a high-risk situation or operation. Portable radio equipment may be designed for ease of operation while providing ready access to certain controls that are frequently manipulated. Frequently manipulated controls may be arranged to minimize inadvertent access through size and location of control knobs. The sizing and placement of the controls of a portable radio is typically only partially effective in preventing inadvertent manipulations when the operator is not fully attentive to the requiring attention operator. For example, the operator may need to adjust channel controls without looking at the radio equipment when the operator is engaged in a high-risk law enforcement operation and when an inadvertent change in volume of the radio output could reveal the presence or position of the operator. In another example, an inadvertent change of channel when the operator is adjusting a volume control could jeopardize effectiveness of an operation due to communication failure. The tradeoff between accessibility, ease of use and preventing unintended changes can be difficult to accomplish and can create jeopardy for the operator.

There is an ongoing need for technology and devices that enable an operator of first-responder portable radio equipment to safely and securely change device settings.

SUMMARY

Certain aspects of the disclosure provide an apparatus that can protect operator safety during critical incidents in the field. Operators may include a first responder such as a law enforcement officer or an officer of another governmental agency, and/or employees of private security companies that utilize the handheld radio systems. Operators may include first responders such as paramedics or fire fighters. In accordance with certain aspects of this disclosure, a cover is provided that can shield certain controls of a handheld radio system from inadvertent manipulation. In some examples, the cover acts as a shield that can prevent accidental adjustments of audible volume, switching between channels, changes of operating mode, and other such modifications of radio system function while an operating is managing a covert or critical incident in the field.

In some aspects of the disclosure, a shield is provided that has a first cylindrical portion configured to fit a first knob of the portable radio, a second cylindrical portion configured to fit a second knob of the portable radio, and a bridge that has a first end and a second end. The first end of the bridge may be fixed or coupled to the first cylindrical portion. The second end of the bridge may be fixed or coupled to the second cylindrical portion. The bridge may be configured to orient the first cylindrical portion and the second cylindrical portion in alignment with the first knob and the second knob.

In one aspect, the first cylindrical portion includes a cut-out configured to expose a portion of the first knob. The cut-out may be configured to enable manipulation of the first knob by an operator of the portable radio.

In one aspect, the second cylindrical portion is configured to expose an upper section of the second knob. The second cylindrical portion may be shorter than the second knob. The second cylindrical portion may be dimensioned to enable manipulation of the upper section of the second knob by an operator of the portable radio.

In certain aspects, the shield has a reinforcing member that is embedded in the bridge. The reinforcing member may be configured to stiffen the bridge. The reinforcing member may be configured to stiffen the shield. At least a portion of the reinforcing member may be embedded in the first cylindrical portion or the second cylindrical portion. The reinforcing member may be configured to maintain a distance separating the first cylindrical portion and the second cylindrical portion. The reinforcing member is constructed from a metal. In some instances, the reinforcing member is constructed from titanium. The reinforcing member may be constructed from a mesh material or a composite material. The reinforcing member may be constructed from a polymer or carbon fiber.

In some aspects of the disclosure, a method for shielding controls of a portable radio includes configuring a first cylindrical portion to fit a first knob of the portable radio, configuring a second cylindrical portion to fit a second knob of the portable radio, and coupling the first cylindrical portion with the second cylindrical portion using a bridge having a first end and a second end. The first end may be fixed or coupled to the first cylindrical portion. The second end may be fixed or coupled to the second cylindrical portion. The bridge may be configured to orient the first cylindrical portion and the second cylindrical portion in alignment with the first knob and the second knob.

In one aspect, the first cylindrical portion includes a cut-out configured to expose a portion of the first knob and to enable manipulation of the first knob by an operator of the portable radio. In another aspect, the second cylindrical portion is configured to expose an upper section of the second knob and to enable manipulation of the upper section of the second knob by an operator of the portable radio. The second cylindrical portion may be shorter than the second knob.

In certain aspects, the method includes embedding a reinforcing member in the bridge. The reinforcing member may be configured to stiffen or strengthen the bridge. The reinforcing member may be configured to maintain a distance separating the first cylindrical portion and the second cylindrical portion.

BRIEF DESCRIPTION OF THE DRAWINGS

FIG. 2 illustrates certain aspects of the operation of the portable radio of FIG. 1.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
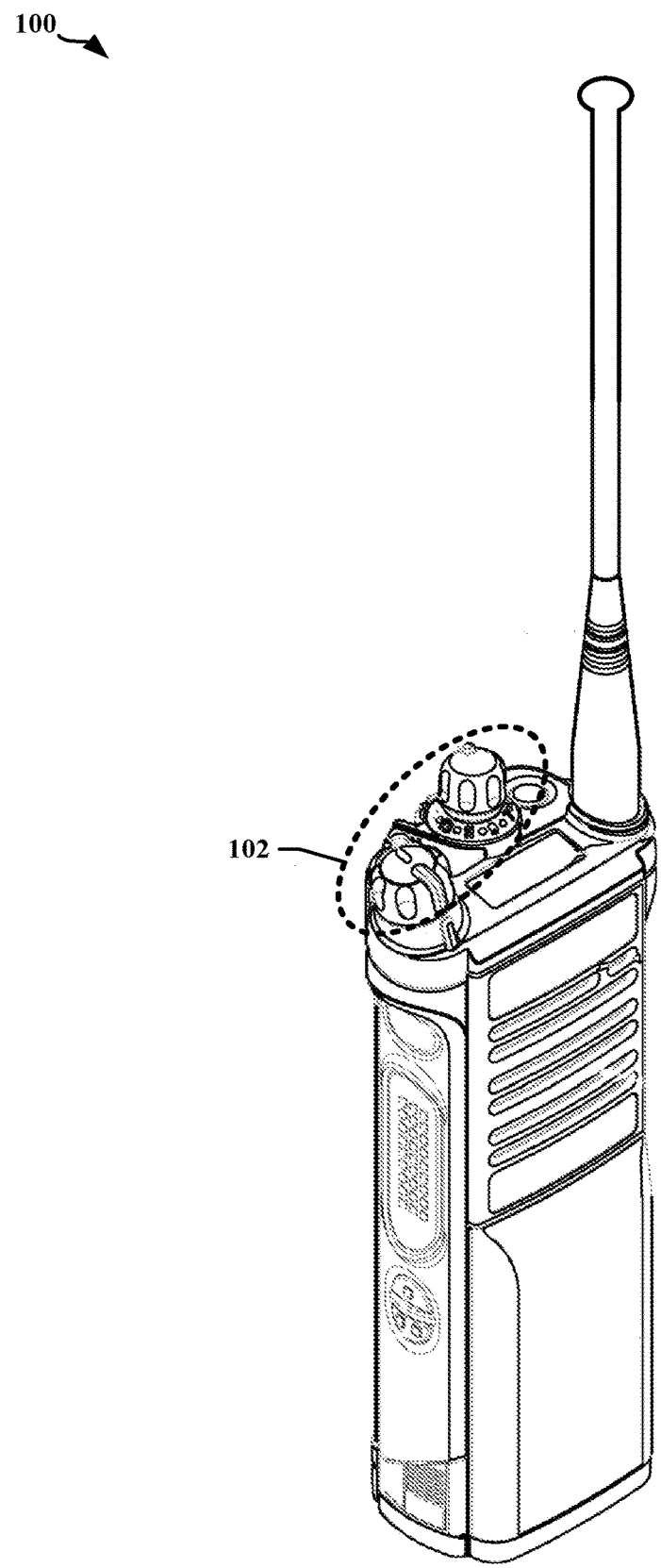
FIG. 1 illustrates an example of a portable radio used by first responders.

FIG. 1 shows an example of a portable radio 100 that may be used by first responders. The concepts disclosed herein are not restricted to any particular brand, model or configuration of handheld or portable radio system. In the illustrated example, certain controls 102 located on an upper surface of the portable radio 100 are configured for easy access by an operator and for ease of use in the field. In many handheld or portable radio systems, individual controls are sized, located and oriented to permit easy visual or tactile identification under normal operating conditions. In some instances, imprecise movements by an operator may inadvertently change the volume, channel or operating mode set for the portable radio 100. In some examples, inadvertent changes may occur when the operator is under stress or duress, operating stealthily or when the operator is otherwise involved in critical incidents in the field. In one example, inadvertent changes may occur when the operator is involved in high-risk enforcement operations.

Inadvertent changes in the operating mode of a handheld radio system can imperil safety of a law enforcement officer, first responders, victims of accidents or criminal activities and third parties in the vicinity of an incident or operation. In one example, a law enforcement operator may need to change channel or select a talk-group while a loudspeaker of the portable radio 100 is muted or in a low-volume mode. If the operator were to brush the volume control while changing channel or talk-group, the presence and/or location of the operator may be prematurely revealed.

FIG. 2 illustrates certain aspects of the operation of the portable radio 100 illustrated in FIG. 1 in more detail. From a first perspective 200, it can be seen that many controls are provided on the body of the portable radio 100 for manipulation by the operator. For example, the controls of the portable radio 100 includes a mode or channel knob 202, a volume/on/off knob 204, private call answer button 206, push-to-talk button 208, multi-button surface 210 and an emergency button 212. The configuration and operation of the channel knob 202, a volume/on/off knob 204 can be seen in the magnified perspective 220. In the illustrated example, the mode or channel knob 202 rotates 222 about a first axis 226 and the volume/on/off knob 204 rotates 224 about a second axis 228 that angles away from the first axis 226. The separation 230 of the first axis 226 from the second axis 228 diminishes approaching the top surface of the portable radio 100. An attempt to adjust one of the two knobs 202 or 204 without looking at the portable radio 100 (e.g., using tactile sensing to locate and select a knob 202 or 204 for adjustment) may cause inadvertent adjustment of the other knob 204 or 202.

Figure 3:
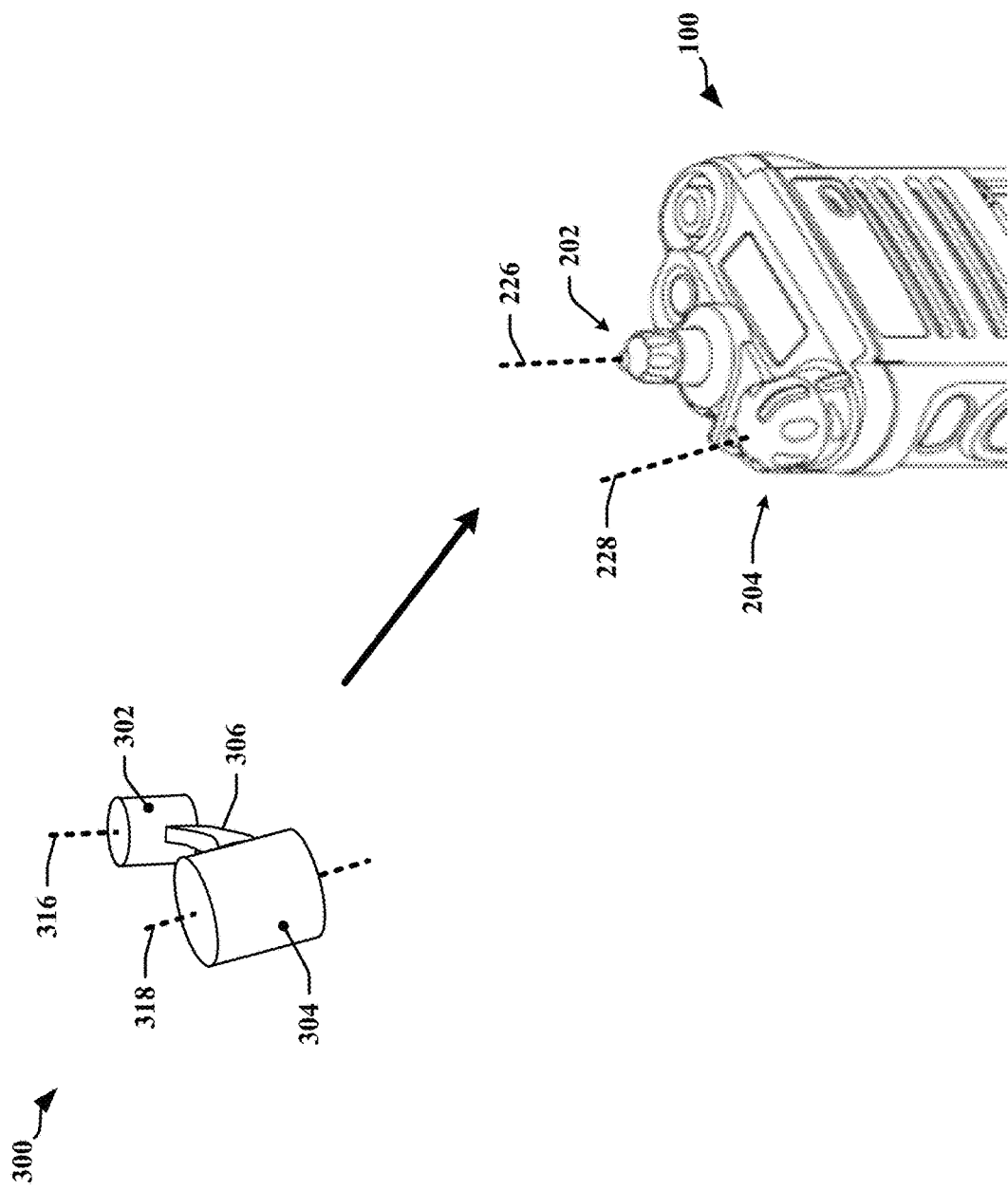
FIG. 3 illustrates certain aspects of a cover that may be manufactured for use with the portable radio of FIG. 1 and in accordance with certain aspects of this disclosure.

Certain aspects of this disclosure relate to a cover that can operate as a mutual shield between two or more control mechanisms of the portable radio. FIG. 3 illustrates certain aspects of an example of a cover 300 that may be manufactured for use with the portable radio 100 of FIG. 1 in accordance with certain aspects of this disclosure. The cover 300 includes two substantially cylindrical portions 302, 304 that are configured to engage two controls. For example, two substantially cylindrical portions 302, 304 may be configured to engage the knobs 202, 204 of the portable radio 100. The substantially cylindrical portions 302, 304 are connected by a bridge 306. The bridge 306 is configured to provide an orientation of the cylindrical portions 302, 304 that matches the orientation of the two knobs 202, 204 to be shielded on the portable radio 100. For example, the bridge 306 is configured to align each cylindrical portion 302, 304 to an axis 316, 318 (respectively) of the corresponding knob 202, 204.

The cover 300 may be constructed from a resin (e.g., a polyurethane resin), polymer, metal, mesh, carbon fiber, composite, ceramic or other material, or some combination thereof. The cover 300 may be manufactured by using 3D printing, molding, cutting, casting, coating, laminating, etching, grinding, and/or other process, alone or in combination. The cover 300 may be constructed to provide desired degrees of stiffness, resilience, flexibility, rigidity, impact resistance and/or mechanical strength. Different portions of the cover 300 may be manufactured from different materials. Different portions of the cover 300 may be manufactured using different manufacturing processes. In one example, at least one of the cylindrical portions 302, 304 may be ceramic and manufactured using 3D printing, and the cylindrical portions 302, 304 may be coupled using a molded polymer bridge 306.

In some implementations, the cover 300 may include an embedded reinforcement. In one example, the embedded reinforcement includes a rod, bar, strip, strap or mesh that is embedded in a resin or polymer structure to provide or improve stiffness, elasticity, strength and/or rigidity of portions of the cover 300. In various examples, the stiffness, elasticity, strength and/or rigidity of the bridge 306 may be improved by embedding a reinforcing member or material within the body of the bridge 306. In some examples, the embedded reinforcement may operate to maintain a minimum or maximum separation between the cylindrical portions 302, 304. In some examples, the embedded reinforcement may operate to maintain the relative orientation of the cylindrical portions 302, 304 with respect to one another.

Figure 4:
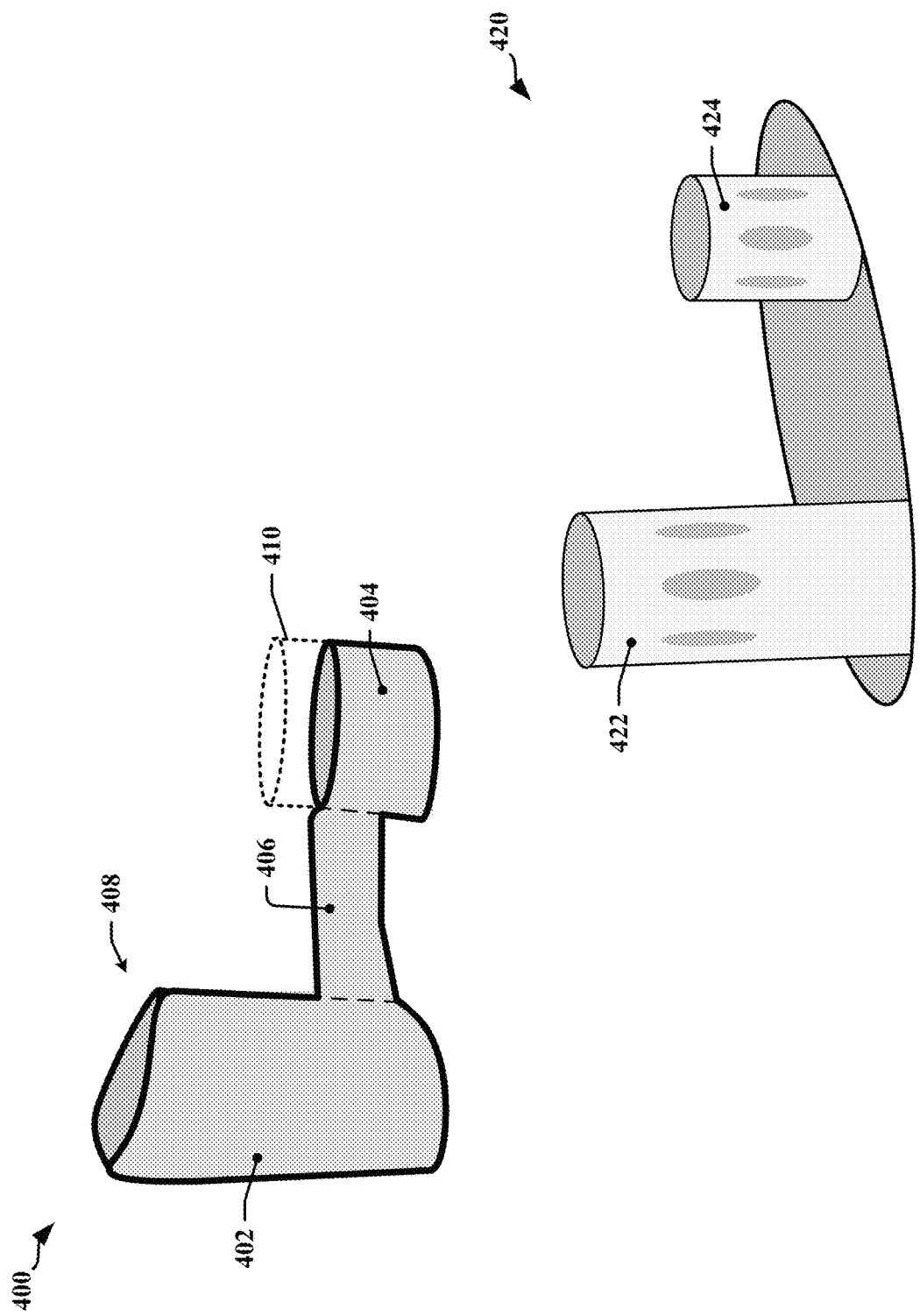
FIG. 4 is a conceptual representation of a cover that may be configured or manufactured for shielding knobs on a portable radio in accordance with certain aspects of this disclosure.

FIG. 4 is a conceptual representation of an example of a shield 400 that may be configured or manufactured for shielding knobs 422, 424 on an upper surface 420 of a portable radio 100 in accordance with certain aspects of this disclosure. The shield 400 may also be referred to as a cover, screen or a shielding cover. Two substantially cylindrical portions 402, 404 at least partially cover the knobs 422, 424. The cylindrical portions 402, 404 are coupled or connected by a bridge 406. The cylindrical portions 402, 404 of the shield 400 may be structured to provide reduced access to certain knobs 422, 424 when installed in position over the knobs 422, 424. In one example, a first cylindrical portion 402 has a cut-out section 408 that is configured to provide an operator access to a sufficient portion of the surface of a first knob 422 to rotate, depress or otherwise manipulate the first knob 422. In another example, a second cylindrical portion 404 is truncated with respect to the length of a second knob 424. The second cylindrical portion 404 is illustrated as having a cut-off section 410. When the shield 400 is installed on the portable radio 100, the absence of the cut-off section 410 provides the operator access to an upper portion of the second knob 424 sufficient to enable the operator to rotate, depress or otherwise manipulate the second knob 424. The cut-out section 408 and/or cut-off section 410 may be sized and located to limit the possibility of inadvertent manipulation, including inadvertent manipulation of one knob 422 or 424 caused when the operator is adjusting a setting of the other knob 424 or 422. For example, the exposed area of the second knob 424 may provide insufficient resistance to cause the second knob 424 to rotate in response to unintended contacts such as the contact caused by brushing motions of a finger or hand of an operator, when the operator is manipulating the first knob 422.

Figure 5:
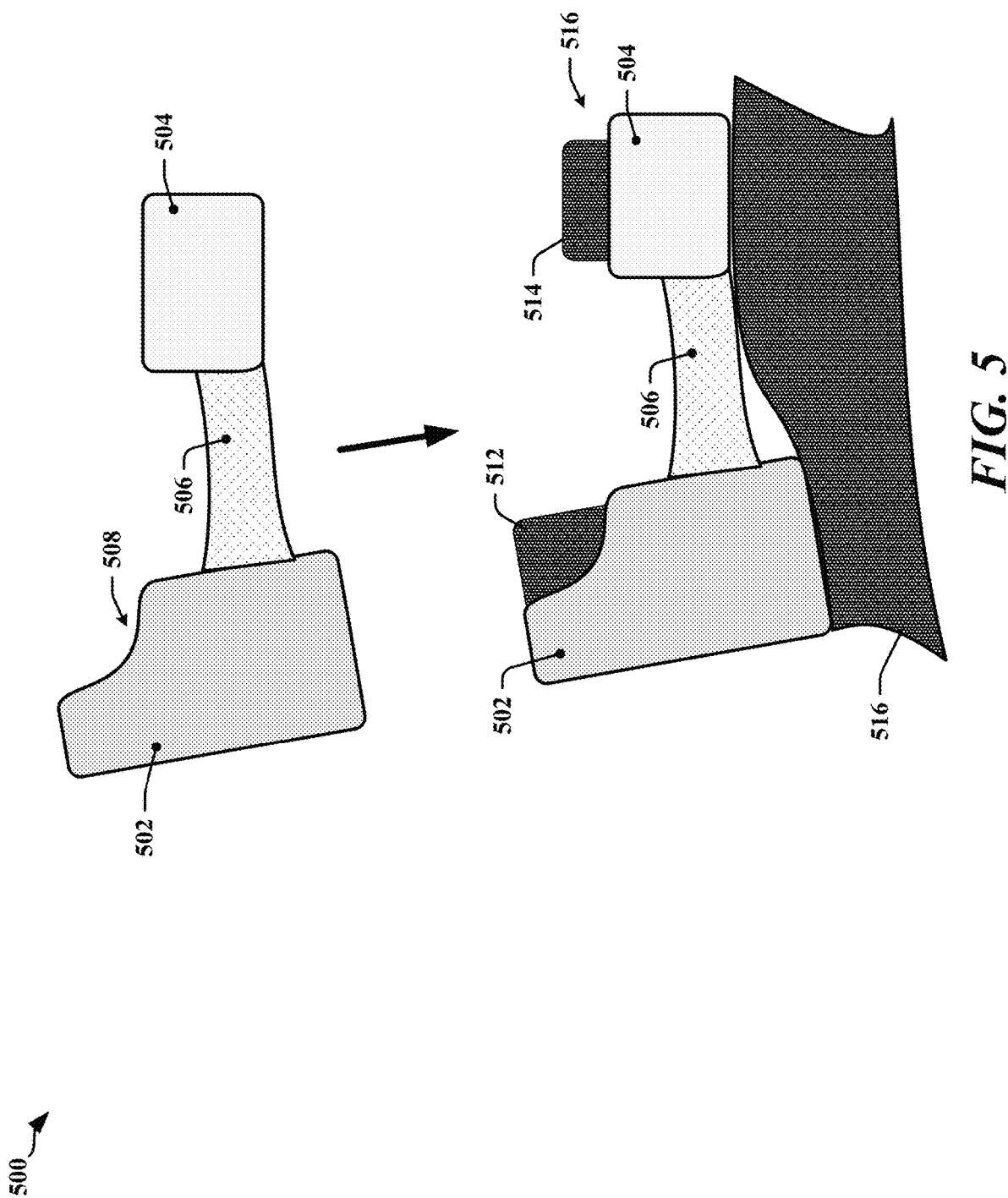
FIG. 5 includes a side view of the cover illustrated in FIG. 4.

FIG. 5 illustrates a shield 500 that includes a pair of cylindrical portions 502, 504 that are separated by a bridge 506. The shield 500 may correspond in some respects to the shield 400 illustrated in FIG. 4. The shield 500 may also be referred to as a cover, screen or a shielding cover. The cylindrical portions 502, 504 of the shield 500 may be structured to provide reduced access to certain knobs 512, 514 when installed in position over the knobs 512, 514. In one example, a first cylindrical portion 502 has a cut-out section 508 that is configured to provide an operator access to a sufficient portion of the surface of a first knob 512 to rotate, depress or otherwise manipulate the first knob 512. In another example, the length of a second cylindrical portion 504 is truncated with respect to the length of a second knob 514 and is configured to provide the operator access to an upper portion of a second knob 514 sufficient to enable the operator to rotate, depress or otherwise manipulate the second knob 514. The cut-out section 508 and/or length of the second cylindrical portion 504 may be sized and located to limit the possibility of inadvertent manipulation, including inadvertent manipulation of one knob 512 or 514 that may occur when the operator is adjusting a setting of the other knob 514 or 512.

FIG. 5 also includes a view of the shield 500 after it has been placed over the knobs 512, 514 of a portable radio. The shield 500 is placed on an upper surface of the body 516 of the portable radio 100, each leaving a portion of the corresponding knob 512, 514 exposed. For example, the second cylindrical portion 504 is shorter in height than the knob 514 that it partially covers.

In some examples, the bridge 506 is formed from an elastic material that is extensible and that can be stretched as the shield 500 is being placed over the knobs 512, 514. In some examples, at least one of the cylindrical portions 502, 504 is formed from an elastic material that is extensible and that permits the cylindrical portion 502 or 504 to be temporarily deformed to facilitate placement of the shield 500 over the corresponding knob 512 or 514. In other examples, at least one of the cylindrical portions 502, 504 is oversized to accommodate the variation in distance between the knobs 512, 514 along the diverging axes about which the knobs are provided.

Figure 6:
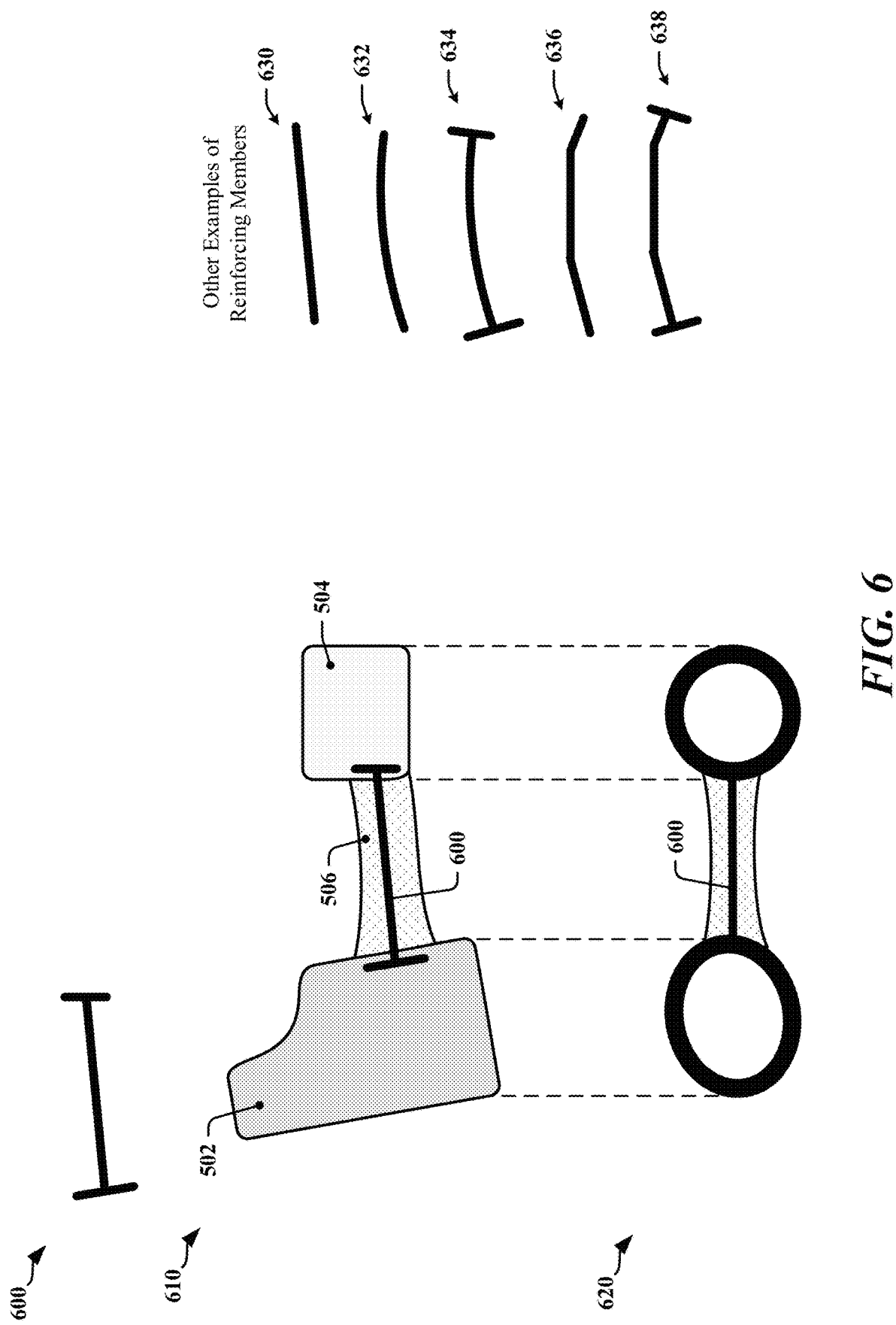
FIG. 6 illustrates an example of a reinforcing member that may be embedded in a cover provided in accordance with certain aspects of this disclosure.

FIG. 6 illustrates an example of a reinforcing member 600 that may be included in the shield 500 in accordance with certain aspects of this disclosure. A cross-sectional side view 610 of the shield 500 and a cross-sectional top view 620 of the shield 500 illustrates one example of the potential placement of a reinforcing member 600 when included in the shield 500. In some examples, the reinforcing member 600 is embedded in the bridge 506. In some examples, a first portion of the reinforcing member 600 is embedded in the bridge 506 and one or more other portions of the reinforcing member 600 are embedded at least one of the cylindrical portions 502, 504.

In some examples, the reinforcing member 600 may comprise a rod, bar, strip, strap or mesh. The reinforcing member 600 may be embedded in a resin or polymer portion of the shield 500 to provide or improve stiffness, strength and/or rigidity of portions of the shield 500. In one example, the reinforcing member 600 may be manufactured from titanium, steel, aluminum or another metallic material. In another example, the reinforcing member 600 may be manufactured from a polymer, carbon fiber or composite material.

The shape, size and structure of the reinforcing member 600 may be selected based on the material used to manufacture the shield 500, the distance spanned by the bridge 506 and/or the material used to manufacture the reinforcing member 600. For example, the rod, bar, strip, strap or mesh may be straight (see reinforcing members 600, 630), curved (see reinforcing members 632, 634) or segmented (see reinforcing members 636, 638). In one example, a segmented reinforcing member 636, 638 may have segments disposed at an angle with respect to one another. In one example, a segmented reinforcing member 636, 638 may have segments that are coupled using hinges. In some instances, the shape, size and structure of the reinforcing member 600, 630, 632, 634, 636, 638 may be configured to maintain separation between the cylindrical portions 502, 504. In some instances, the shape, size and structure of the reinforcing member 600, 630, 632, 634, 636, 638 may be configured to maintain the relative orientation of the cylindrical portions 502, 504. In some instances, the shape, size and structure of the reinforcing member 600, 630, 632, 634, 636, 638 may be configured to maintain the relative location of the cylindrical portions 502, 504.

In some examples, the reinforcing member 600 (for example) is embedded after fabrication of the shield 500. In one example, the reinforcing member 600 is inserted into a slot, channel, groove, hole or other opening provided in the bridge 506. In some instances, the reinforcing member 600 is inserted into a slot or channel in the bridge 506 through a hole or opening provided through one of the cylindrical portions 502, 504. In some instances, the reinforcing member 600 may be retained in place within a slot, channel, groove or hole in the bridge 506 using a glue or a fastener. In some instances, the reinforcing member 600 is inserted into a slot, channel, groove or hole provided in the bridge 506 before the bridge 506 is joined to one or more of the cylindrical portions 502, 504. In one example, the bridge 506 is formed as two halves, and the reinforcing member 600 is inserted between the two halves before the two halves are bonded, welded, glued or otherwise fastened or joined to form the bridge 506. In some examples, the bridge 506 is molded or otherwise formed around the reinforcing member

600 during manufacture. In some examples, the bridge 506 and at least one of the cylindrical portions 502, 504 is molded or otherwise formed around the reinforcing member 600 before the bridge 506 is joined to one or more of the cylindrical portions 502, 504.

In some implementations, a reinforcing mesh material may be used to improve certain mechanical properties of the shield 400, including increasing shear strength, yield strength, resistance to fatigue, etc. In one example, the shield 500 may have an embedded mesh or fabric made from materials such as Polytetrafluoroethylene (PTFE), carbon fiber, or other suitable material.

Figure 7:
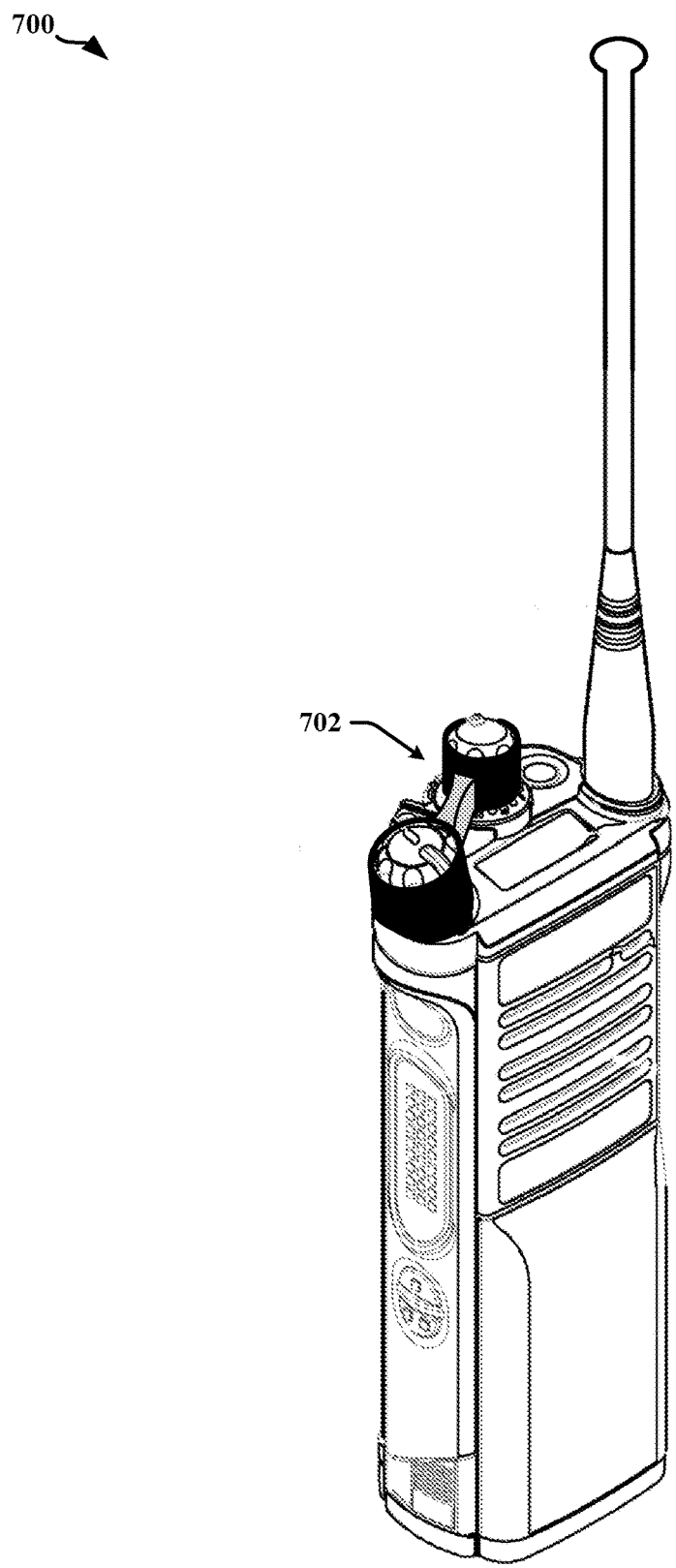
FIG. 7 illustrates an example of a cover fitted to a mobile radio in accordance with certain aspects disclosed herein.

FIG. 7 illustrates an example of a cover or shield 702 fitted to a mobile radio 700 in accordance with certain aspects disclosed herein.

In one implementation, a shield 500 (see FIG. 5) may be configured for use with a handheld radio system such as the portable radio 100 illustrated in FIG. 1. The shield 500 may provide mutual shielding between control elements of the handheld radio system. The control elements may include switches, dials, pushbuttons, slider switches, knobs or the like. In some examples, the shield 500 includes a first cylindrical portion 502 configured to fit a first knob 512 of the handheld radio system, a second cylindrical portion 504 configured to fit a second knob 514 of the handheld radio system, and a bridge 506. A first end of the bridge 506 may be fixed to the first cylindrical portion 502, and a second end of the bridge 506 may be fixed to the second cylindrical portion 504. The bridge 506 may be configured to orient the first cylindrical portion 502 and the second cylindrical portion 504 in alignment with the first knob 512 and the second knob 514, respectively.

In one example, the first cylindrical portion 502 includes a cut-out section 508 configured to expose a portion of the first knob 512. The cut-out may be configured to enable manipulation of the first knob 512 by an operator of the handheld radio system. In another example, the second cylindrical portion 504 is configured to expose an upper section of the second knob 514. The second cylindrical portion 504 may be shorter than the second knob 514. The second cylindrical portion 504 may be dimensioned to enable manipulation of the upper section of the second knob by an operator of the portable radio.

In certain examples, the shield 400 includes a reinforcing member 600 that may be embedded in the bridge 506. The reinforcing member 600 may be manufactured or configured to stiffen or strengthen the bridge, and/or to stiffen or strengthen other portions of the shield 400. In some instances, at least a portion of the reinforcing member 600 is embedded in the first cylindrical portion 502. In some instances, at least a portion of the reinforcing member 600 is embedded in the second cylindrical portion 504.

In certain examples, the reinforcing member 600 is configured to maintain a distance separating the first cylindrical portion 502 and the second cylindrical portion 504. In one example, the reinforcing member may be constructed from a metal or an alloy. In one example, the reinforcing member may be constructed from titanium or aluminum. In one example, the reinforcing member may be constructed from a mesh material or a composite material. In one example, the reinforcing member may be constructed from a polymer, a mesh material, a composite material, carbon fiber. In one example, the reinforcing member 600 is constructed from PTFE.

Figure 8:
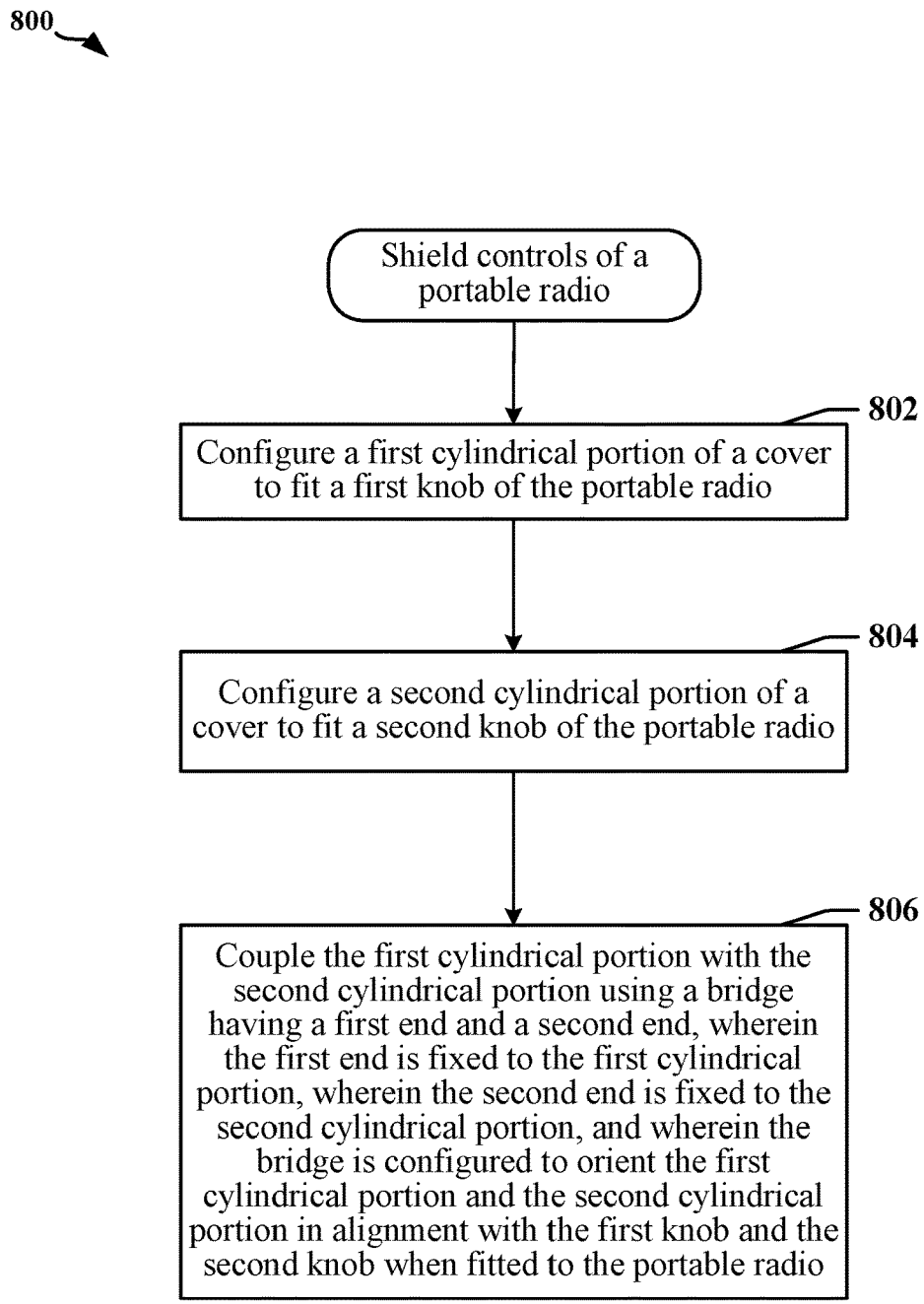
FIG. 8 is a flow diagram illustrating certain aspects of a method for shielding controls of a portable radio according to certain aspects of this disclosure.

FIG. 8 is a flow diagram 800 illustrating certain aspects of a method for shielding controls of a portable radio. At block 802, a first cylindrical portion of a cover may be configured to fit a first knob of the portable radio. At block 804, a second cylindrical portion of the cover may be configured to fit a second knob of the portable radio. At block 806, the first cylindrical portion with the second cylindrical portion may be coupled using a bridge having a first end and a second end. The first end may be fixed to the first cylindrical portion. The second end may be fixed to the second cylindrical portion. The bridge may be configured to orient the first cylindrical portion and the second cylindrical portion in alignment with the first knob and the second knob when fitted to the portable radio.

In some examples, the first cylindrical portion includes a cut-out configured to expose a portion of the first knob and to enable manipulation of the first knob by an operator of the portable radio. In some examples, the second cylindrical portion is configured to expose an upper section of the second knob and to enable manipulation of the upper section of the second knob by an operator of the portable radio. The second cylindrical portion may be shorter than the second knob.

In some examples, a reinforcing member may be embedded in the bridge. The reinforcing member may be configured to stiffen the bridge. The reinforcing member may be configured to maintain a distance separating the first cylindrical portion and the second cylindrical portion.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A shield manufactured for use with a portable radio, comprising:
    a first cylindrical portion configured to fit a first knob of the portable radio when the shield is fitted to the portable radio and further configured to limit access to the first knob by an operator of the portable radio;
    a second cylindrical portion configured to fit a second knob of the portable radio when the shield is fitted to the portable radio and further configured to limit access to the second knob by the operator of the portable radio; and
    a bridge having a first end and a second end, wherein the first end is coupled to the first cylindrical portion, wherein the second end is coupled to the second cylindrical portion, wherein the bridge is configured to orient the first cylindrical portion and the second cylindrical portion in alignment with the first knob and the second knob when the shield is fitted to the portable radio, and wherein at least one cylindrical portion is formed from an elastic material that is extensible and that permits the at least one cylindrical portion to be temporarily deformed to facilitate placement of the shield over the corresponding knob.

2. The shield for the portable radio of claim 1, wherein the first cylindrical portion includes a cut-out configured to expose a portion of the first knob, wherein the first knob is otherwise covered by the first cylindrical portion.

3. The shield for the portable radio of claim 2, wherein the cut-out is configured to enable manipulation of the first knob by the operator of the portable radio.

4. The shield for the portable radio of claim 1, wherein the second cylindrical portion is configured to expose an upper section of the second knob, wherein the second knob is otherwise covered by the second cylindrical portion.

5. The shield for the portable radio of claim 4, wherein the second cylindrical portion is shorter than the second knob.

6. The shield for the portable radio of claim 4, wherein the second cylindrical portion is dimensioned to enable manipulation of the upper section of the second knob by the operator of the portable radio.

7. The shield for the portable radio of claim 1, further comprising:
a reinforcing member embedded in the bridge.

8. The shield for the portable radio of claim 7, wherein the reinforcing member is configured to stiffen the bridge.

9. The shield for the portable radio of claim 7, wherein the reinforcing member is configured to strengthen the shield.

10. The shield for the portable radio of claim 7, wherein at least a portion of the reinforcing member is embedded in the first cylindrical portion or the second cylindrical portion.

11. The shield for the portable radio of claim 7, wherein the reinforcing member is configured to maintain a distance separating the first cylindrical portion and the second cylindrical portion.

12. The shield for the portable radio of claim 7, wherein the reinforcing member is constructed from titanium.

13. The shield for the portable radio of claim 7, wherein the reinforcing member is constructed from a metal.

14. The shield for the portable radio of claim 7, wherein the reinforcing member is constructed from a mesh material or a composite material.

15. The shield for the portable radio of claim 7, wherein the reinforcing member is constructed from a polymer or carbon fiber.

16. A method for shielding controls of a portable radio, comprising:
configuring a first cylindrical portion of a cover to fit a first knob of the portable radio when the cover is fitted to the portable radio and to limit access to the first knob by an operator of the portable radio, the cover having been manufactured for use with the portable radio;
configuring a second cylindrical portion of the cover to fit a second knob of the portable radio when the cover is fitted to the portable radio and to limit access to the second knob by an operator of the portable radio; and
coupling the first cylindrical portion with the second cylindrical portion using a bridge having a first end and a second end, wherein the first end is fixed to the first cylindrical portion, wherein the second end is fixed to the second cylindrical portion, wherein the bridge is configured to orient the first cylindrical portion and the second cylindrical portion in alignment with the first knob and the second knob when the cover is fitted to the portable radio, and wherein at least one cylindrical portion is formed from an elastic material that is extensible and that permits the at least one cylindrical portion to be temporarily deformed to facilitate placement of the cover over the corresponding knob.

17. The method of claim 16, wherein the first cylindrical portion includes a cut-out configured to expose a portion of the first knob and to enable manipulation of the first knob by the operator of the portable radio.

18. The method of claim 16, wherein the second cylindrical portion is configured to expose an upper section of the second knob and to enable manipulation of the upper section of the second knob by the operator of the portable radio, and wherein the second cylindrical portion is shorter than the second knob.

19. The method of claim 16, further comprising:
embedding a reinforcing member in the bridge, wherein the reinforcing member is configured to stiffen or strengthen the bridge.

20. The method of claim 19, wherein the reinforcing member is configured to maintain a distance separating the first cylindrical portion and the second cylindrical portion.

* * * * *